(12) United States Patent
Hanson et al.

(10) Patent No.: US 6,985,950 B1
(45) Date of Patent: Jan. 10, 2006

(54) SYSTEM FOR CREATING A SPACE-EFFICIENT DOCUMENT CATEGORIZER FOR TRAINING AND TESTING OF AUTOMATIC CATEGORIZATION ENGINES

(75) Inventors: Andrew Hanson, Portland, OR (US); David B. Lamkins, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 09/800,766

(22) Filed: Mar. 6, 2001

(51) Int. Cl.
*G06F 17/30* (2006.01)

(52) U.S. Cl. .......................... 709/226; 709/228; 707/3; 707/4

(58) Field of Classification Search .............. 709/219, 709/224, 226, 227, 228, 245; 707/10, 3, 707/105, 4, 5; 713/171
See application file for complete search history.

(56) References Cited

U.S. PATENT DOCUMENTS

| | | | |
|---|---|---|---|
| 5,461,698 A | 10/1995 | Schwanke et al. | |
| 5,640,468 A | 6/1997 | Hsu | |
| 5,652,829 A | 7/1997 | Hong | |
| 5,657,424 A | 8/1997 | Farrell et al. | |
| 5,706,507 A | 1/1998 | Schloss | |
| 5,708,822 A | 1/1998 | Wical | |
| 5,734,796 A | 3/1998 | Pao | |
| 5,768,580 A | 6/1998 | Wical | |
| 5,809,499 A | 9/1998 | Wong et al. | |
| 5,812,995 A | 9/1998 | Sasaki et al. | |
| 5,835,905 A | 11/1998 | Pirolli et al. | |
| 5,867,799 A | 2/1999 | Lang et al. | |
| 5,870,744 A | 2/1999 | Sprague | |
| 5,911,043 A | 6/1999 | Duffy et al. | |
| 5,920,864 A | 7/1999 | Zhao | |
| 6,055,540 A | 4/2000 | Snow et al. | |
| 6,058,205 A | 5/2000 | Bahl et al. | |
| 6,073,137 A * | 6/2000 | Brown et al. | |
| 6,101,515 A | 8/2000 | Wical et al. | |
| 6,101,527 A * | 8/2000 | Lejeune et al. | 709/201 |
| 6,128,613 A | 10/2000 | Wong et al. | |
| 6,161,130 A | 12/2000 | Horvitz et al. | |
| 6,163,778 A | 12/2000 | Fogg et al. | |
| 6,233,575 B1 | 5/2001 | Agrawal et al. | |
| 6,249,785 B1 | 6/2001 | Paepke | |
| 6,252,988 B1 | 6/2001 | Ho | |
| 6,285,999 B1 | 9/2001 | Page | |
| 6,370,543 B2 * | 4/2002 | Hoffert et al. | 707/104.1 |
| 6,430,558 B1 | 8/2002 | Delano | |
| 6,473,753 B1 | 10/2002 | Katariya et al. | |
| 6,507,843 B1 | 1/2003 | Dong et al. | |
| 6,519,580 B1 | 2/2003 | Johnson et al. | |
| 6,526,442 B1 * | 2/2003 | Stupek et al. | 709/224 |
| 6,592,627 B1 * | 7/2003 | Agrawal et al. | |
| 6,604,114 B1 | 8/2003 | Toong et al. | |
| 6,658,463 B1 * | 12/2003 | Dillon et al. | 709/219 |

(Continued)

FOREIGN PATENT DOCUMENTS

WO    WO 01/33413 A1    5/2001

*Primary Examiner*—Zarni Maung
*Assistant Examiner*—Khanh Quang Dinh
(74) *Attorney, Agent, or Firm*—Senniger Powers

(57) ABSTRACT

A method of receiving a network resource address and creating a copy of the network resource and storing the created copy in a database is provided. This creation and storage of a copy of the network resource is performed when there does not exist, in the database, information derived from the resource pointed to by the network address.

29 Claims, 8 Drawing Sheets

U.S. PATENT DOCUMENTS

| | | |
|---|---|---|
| 6,721,741 B1 * | 4/2004 | Eyal et al. .................... 707/10 |
| 6,785,671 B1 * | 8/2004 | Bailey et al. ................... 707/3 |
| 2001/0032029 A1 | 10/2001 | Kauffman |
| 2001/0042085 A1 | 11/2001 | Peairs et al. |
| 2002/0099730 A1 | 7/2002 | Brown et al. |
| 2002/0152222 A1 | 10/2002 | Holbrook |

* cited by examiner

FIG. 3

| MetaTag TYPE | MetaTag VALUE |
|---|---|
| FILENAME | |
| URL | http://www.microsoft.com |
| HEADER | |
| CATEGORY | |
| FILE FORMAT | |
| LOCK | |

COMPRESSED WEB PAGE CONTENT

SYSTEM FOR CREATING A SPACE-EFFICIENT DOCUMENT CATEGORIZER FOR TRAINING AND TESTING OF AUTOMATIC CATEGORIZATION ENGINES

FIELD OF THE INVENTION

This invention relates to the field of data processing. Specifically this invention relates to the storage, retrieval and processing of text files for the creation, manipulation and maintenance of category hierarchy for a database.

BACKGROUND OF THE INVENTION

As content of the World Wide Web (the Web) increases, users are finding it more difficult to search the content of the Web as well as experiencing problems merely navigating the content of the Web. Early methods of providing a user with an ability to search the content of the Web can be separated into two approaches.

The first approach involves the generation of an indexed database that is created based on the contents of web pages. This indexed database is created by automated search engines that systematically acquire web pages while searching for new and unique pages. This indexed database can then be searched using various query techniques. From these queries, references in the database can be presented to the user. The provided references are often ranked based on similarity to the form of the query.

In the second approach, web pages are fetched as mentioned above and are grouped into a categorical hierarchy, typically presented in tree format. The user then makes a series of selections while descending the hierarchy, with one or more choices at each level. These choices represent salient differences between the subtrees below the decision point. Several complexities are associated with the creation and usage of a categorical hierarchy. First, there are over one billion web pages making the manual categorization of such a volume of data prohibitively expensive. Second, the content of the web changes continuously. Because of those continuous changes, inconsistencies arise when attempting to re-access a page read on a prior occasion.

SUMMARY OF THE INVENTION

Embodiments of the invention overcome one or more deficiencies in the prior art by providing, among other things, a space-efficient database system optimized for the process of categorizing pages and creating a stable training and testing environment for the generation of automatic categorization engines. The present invention provides a database that is stable and independent of any changes that may occur to the contents of an original page. Accordingly, a method (or an apparatus) for providing a space-efficient database system optimized for the process of categorizing pages is desired to address one or more of these and other disadvantages.

In accordance with one aspect of the invention, a method comprises receiving a locator of a network resource and determining if a database already contains stored information derived from the network resource at a previous point in time, effectively freezing the network resource to the previous point in time. The method further comprises storing information derived from the network resource pointed to by the locator of the network resource upon determination that the database does not contain stored information derived from the network resource at the previous point in time. The process of storing comprises creating a copy of at least a portion of the network resource pointed to by the locator and writing the copy to the database.

In accordance with another aspect of the invention, an apparatus comprises a storage medium having stored therein a plurality of programming instructions and a processor coupled to the storage medium to execute the programming instructions. The programming instructions are designed to (i) receive a locator, (ii) determine if information is previously stored; and (iii) store information generally as set forth above.

Alternatively, the invention may comprise various other methods and apparatuses.

Other features will be in part apparent and in part pointed out hereinafter.

BRIEF DESCRIPTION OF THE DRAWINGS

FIG. 3—Example of a file representing a web page stored on an embodiment of the present invention.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, algorithms, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Definitions

The following abbreviations are used in the description of the present invention. These abbreviations refer to internet RFCs as known by those skilled in the art.

HTTP—Hypertext Transfer Protocol
URL—Uniform Resource Locator
HTML—Hypertext Markup Language Overview Methods are being developed for creating automatic categorizers to help the next generation of search engines to provide more relevant search results. This is critical given the growth in the number of web pages available. Such systems utilize automatic decision engines which determine, on the basis of keywords, n-grams or other textual, statistical or contextual analysis, the most appropriate category or categories for a particular page. The development of such categorizers depends upon a basis of annotated data from which the automatic decision engines can be trained and tested.

The present invention is a space-efficient database system optimized for the process of categorizing pages and creating a stable training and testing environment for the generation of automatic categorization engines. Such a system provides pages that can be delivered to browsers quickly and in a form that is stable and independent of any changes which might occur in the content of the page as provided by its original source.

Category Server

Figure 1:
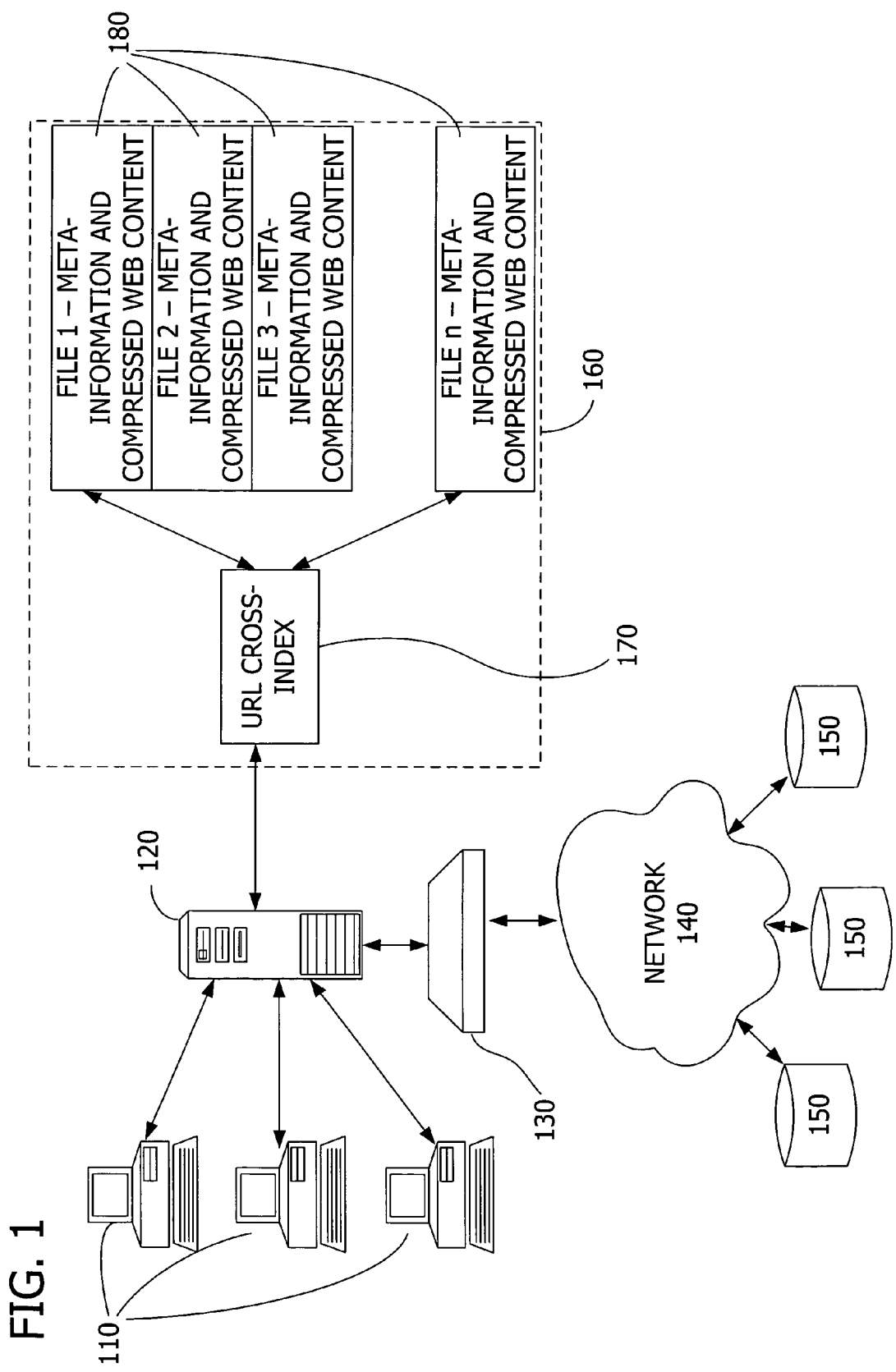
FIG. 1—Embodiment of the present invention in network context.

FIG. 1 shows an embodiment of the present invention. In this embodiment, generic user agents 110 executing on user machines present user's requests for URLs to the category server 120. In this respect, the category server acts as a standard HTTP server. However, the category server 120 in this embodiment provides other functions. In addition to providing HTTP server functionality, the category server provides meta information editing functionality, and URL retrieving and processing functionality.

HTTP Server

Figure 2:
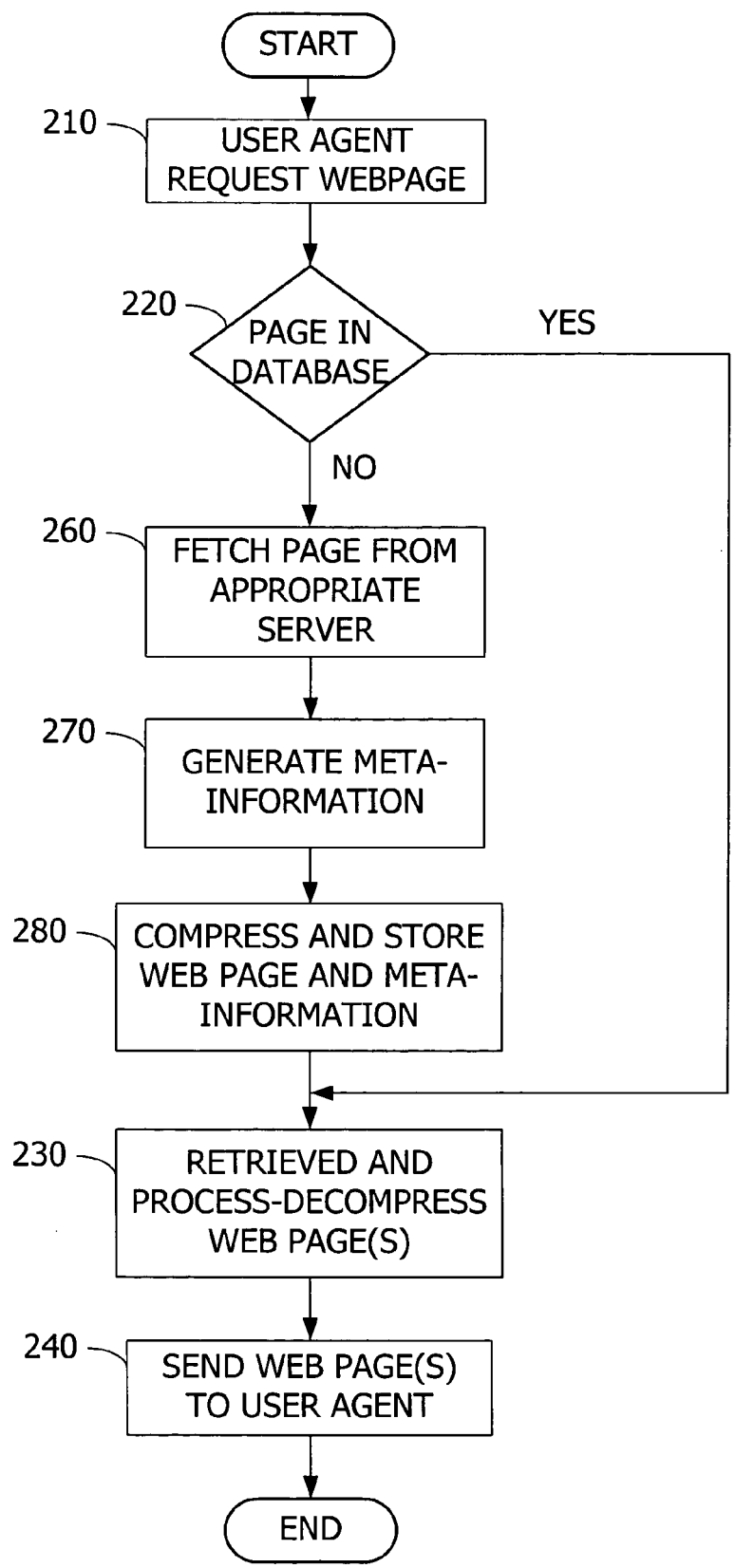
FIG. 2—Flowchart for one embodiment of adding a web page's content to the database.

The first function of this embodiment of the category server 120 is an HTTP server. FIG. 2 shows a flowchart for the task of retrieving URL information for display to the user. In the capacity as an HTTP server, the user specified URL, as provided 210 by the user agent 110, is interpreted by reference to the stored pages 180 in the database engine 160. The database engine 160 is a database that is part of the present invention. In attempting to provide the web pages associated with the requested URL, the category server 120 will look to the database 160 of the present invention 220. If the web page is found stored in the database, the web pages are processed 230 and provided to the user agent 240 as if the page had been delivered from the original host server for the request URL. For example, in this embodiment, the web pages are stored in a compress format to conserve space and will need to be decompressed prior to being presented to the user. By providing content to the user that is, when possible, derived from content that was stored in the database at a previous point in time, the invention ensures that the content of the page has not been altered from that previous point in time when the web page was first viewed or categorized by a first user. If the page is not in the database, however, the page will not be found. In such a case, the steps described below in "URL Retriever and Processor" are performed to store a copy of the web page in the database.

In the present embodiment, the database engine 160, including URL cross-index 170 and the stored web content pages 180, are co-located with the category server. However there is no requirement for having the database engine 160 be co-located with the category server 120. The database engine 160, or either of its constituent parts, the URL cross-index 170 or the stored pages 180, may reside on any machine networked to the category server. Moreover, the constituent parts that make-up the set of stored page 180 may also be spread across multiple machines, disks and/or networks. The storage of information in the database engine is described in further details in subsequent sections.

URL Retriever and Processor

In this embodiment of the present invention, the category server also operates to retrieve new pages from the web. The flowchart from FIG. 2 provides information on the tasks for one embodiment of the present invention. When a user supplies 110, to the category server 120, a URL for a web page that is not stored in the database 160, the category server 120 will utilize the web gateway 130. In this manner, the category server will retrieve the contents of the original page 260 from its corresponding host server 150.

In one embodiment of the present invention the category server will, after reading the requested page from the corresponding host server 150, extract meta information from the web page 270. This process is described below. Next, the invention will compress and store the web page, all files associated with the web page and the extracted meta information in a file 280 in a database of the category server 180. Finally, the information is retrieved from the stored database and provided to the user agent 230–240. By providing the user with the information from the database 180, instead of directly from the original source server 150, the display of the web page information will be the same the first time as subsequent times, thereby meeting the stability need of the processes used to generate the document categorizer.

All cross-references contained within the stored pages are altered to refer to internally stored pages. In this manner, problems are eliminated with respect to missing or out-of-date pages. For example, a web page may contain graphic images that reside in separate files. In this embodiment, these graphic files will be compressed along with the text of the web page into a single compressed image for the web page referenced. File compression is known to those skilled in the art. Application programs providing such functionality includes gzip, winzip and pkzip. The method of file compression is not relevant to the present invention. The compressed text and images of the web page will be written to a file 180. Note that while file compression provides advantages in terms of storage space, this is not required for the present invention. Simply locating of the web pages in the database supplies the advantage of a stable training and testing database independent of any changes that may occur in the original source.

FIG. 3 shows a file entry 180 in the database 160 for one embodiment of the present invention. As previously mentioned, the compressed web content 186 is stored in a file. In addition to the compressed web content in the file of the present embodiment, there is meta-information stored in the form of a type-value pair. Meta-information is information that is related to the stored web content. In this embodiment of the invention, several fields of meta-information are created by default, and the corresponding fields are populated when the web content is saved. For example, the type field URL 182 is paired with a value field 184 to store the location of where this web page was initially obtained. Other type-value pairs in this embodiment which are written during the initial creation of the entry in the database include; a language value to indicate the language of the text in the web page and header information that is parsed from the header of the HTML code. In another embodiment of the invention, meta information specific to all objects stored in the file is maintained. For example, a file format to indicate whether the page was text or binary may be provided when storing applets in addition to web page textual data.

In another embodiment of the present invention, upon creation of a new entry in the database by the saving of a web page, the user is prompted for which meta types and corresponding information to write to the saved database entry. In another embodiment of the present invention, no meta-information is stored during the initiate save, but the user can subsequently add meta-information through the meta-information editor described in further details below.

Graphics images, and other non-text files that occupy a great deal of space, may create special handling procedures for the present invention. In one embodiment, the graphic images are not saved with the page that references them. In such an embodiment, only the textual web site data is saved. In another embodiment, which also does not save these images, the original source web page is modified to delete references to the images that were not stored. The same types of procedures for saving non textual parts of a web page containing images can apply to other non-graphic files that are referenced by a web page.

In another embodiment of the present invention, special processing is performed for a web page that contains frames. In this embodiment of the invention, all sub-frame information of the web page containing frames are read and compressed with the web page content. Additionally, special meta-types are created to contain information about the location of frames and sub-frames within the main web page. In this embodiment, all the content of the frames and sub-frames are stored in a single compressed file with the meta-information. In another embodiment of the invention, the content of sub-frames may be stored in separate files.

As mentioned, pages are generally retrieved from the original source rather than from the database copies only when the data does not exist in the database. In one embodiment of the present invention, the pages retrieved from the original source are displayed to the user via the user agent concurrent with their storage to the database. In another embodiment of the present invention, the pages displayed to the user are the pages that are first stored in the database. In this embodiment the information displayed to the user is that which is retrieved from the copy that is stored in the database. In one embodiment, the user can choose to override the retrieval of the existing database copy 180 of a web page and retrieve a copy of the web page from the original source 150. In one embodiment, the user can choose to override the retrieval from the database copy 180, display a copy of the original source 150 at the user display 110 and store a new copy of the original source in the database 180. This new copy of the existing web page entry can be stored as a new version, hence keeping the old version in the database, or it can overwrite the old version.

Meta-Information Editor

As mentioned previously, meta information can be stored with the compressed web page content. One embodiment of the invention may have a predefined set of meta types and information fields that will be populated with information automatically upon saving of a web page in the database. This information will be derived from the content of the web page. For example, web pages containing links to other web pages that are not contained within the server containing the original web page may, when stored in an embodiment of the present invention, have a meta type which indicates external servers linked to and values corresponding to the address of those servers. Another embodiment may not provide any default meta types or information for a web page. In such a case, the user will need to explicitly provide meta type and information to be stored in the database.

Certain embodiments will need to have either the ability to edit the default meta types and data for a web page or the ability to add meta types and information to a stored web page. Other embodiments will need the ability to perform both of these functions. Resultantly, a third potential feature of the category server is the ability to edit the meta-types and information for a web site.

Figure 4A:
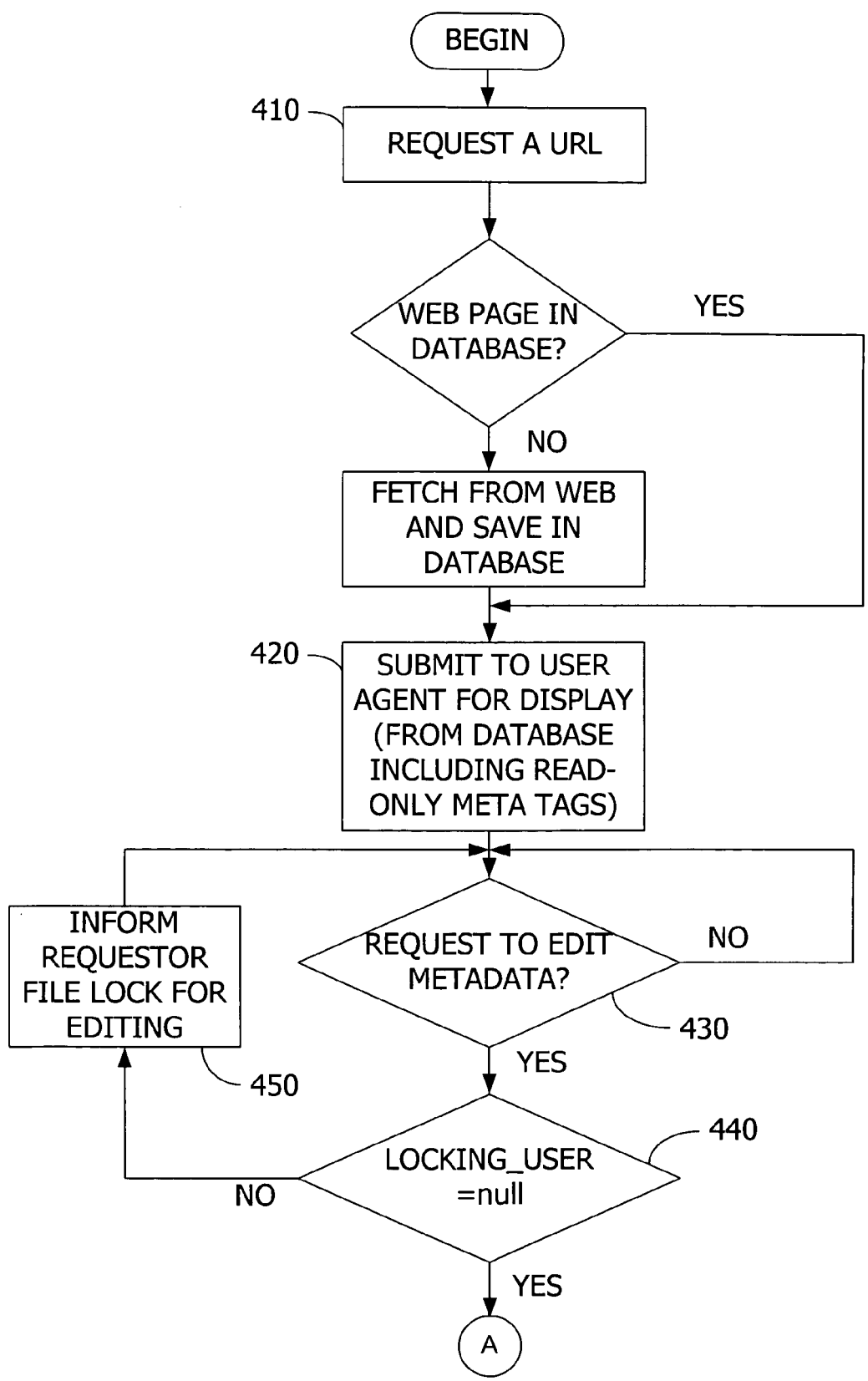
FIGS. 4A & 4B—Flowchart for one embodiment showing how to lock the database for a web page contenting meta data.
Figure 4B:
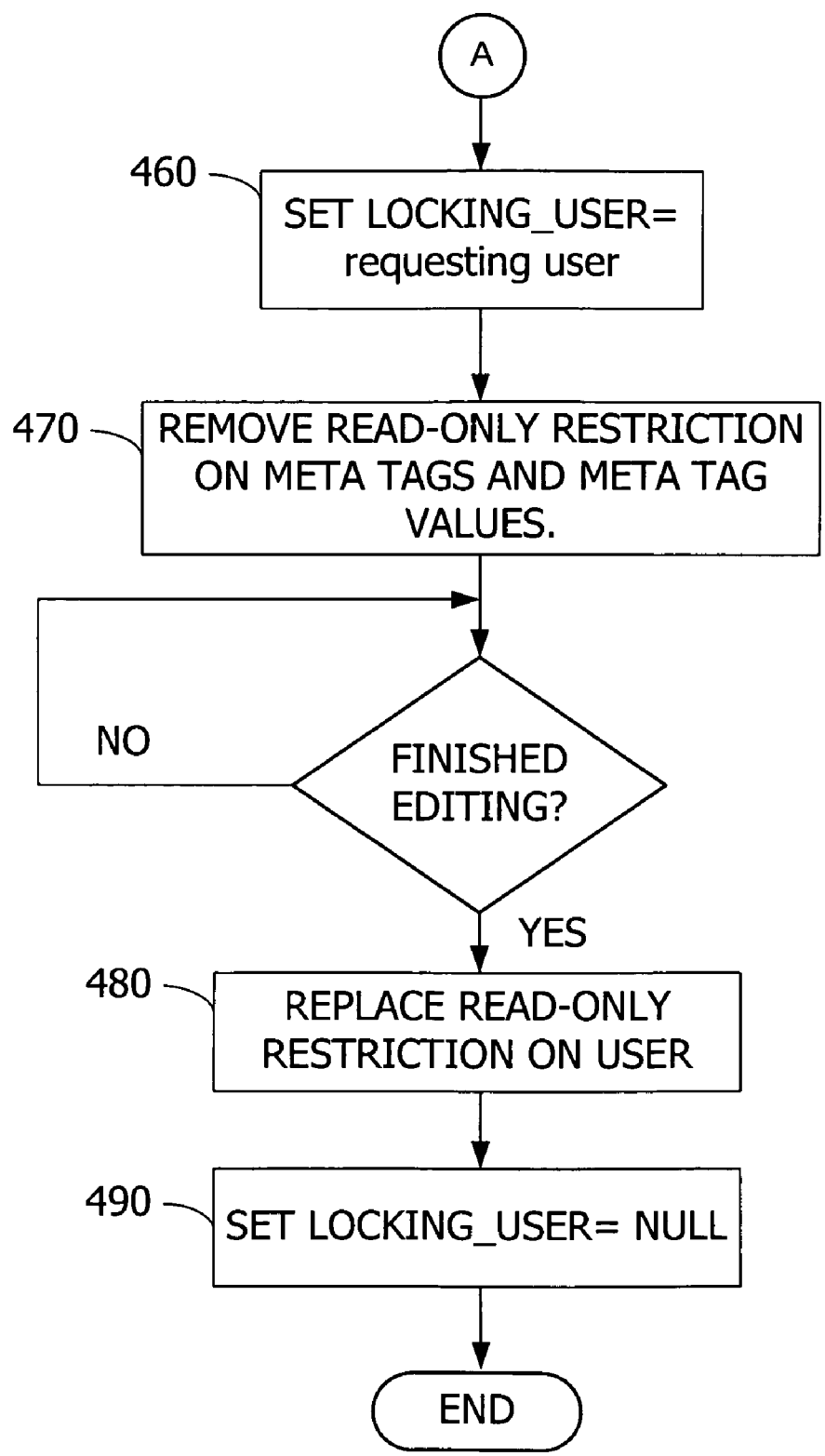

As discussed above, FIG. 3 shows several of the meta types and information (meta types and information collectively referred to as meta data) for an embodiment of the present invention. In one embodiment of the present invention, one of the field types is "Locking User". FIG. 4 shows a flowchart describing the procedure of allowing editing of meta data, while making sure that modification of the meta data by more than one viewer concurrently of the web page doesn't result in the corruption of a database. In this case, a user, by providing the category server with the appropriate URL, can request that a web page be displayed 410. The web page will be provided to the user agent for display to the user 420. At this point, the user will have the ability, via the user agent, to request that the user be allowed to edit the meta data that is associated with the displayed web page 430. When such a request is made, the value of the field corresponding to the "Locking User" type is checked in the meta database 440. If the value is set to something other than null, it is assumed that the meta data is already being edited by the user whose name appears in this field. In such a case, the request to edit the data is denied, the user is notified that he is not allowed to edit the meta data, and the user is provided with the name of the current editor 450. In this embodiment, the user is instructed to try back later to see if the meta data is available for editing. In another embodiment, the user is informed when the locking user removes his lock. Other embodiment possibilities involve allowing changes, caching them and then merging the changes into the database once the previous user has released the lock. If there is no one editing the file, the category server will set the lock to the current user that has requested editing 460. At this time, the category server allows edits of the meta tags and there values for the web page being viewed by the user 470. When the user is finished editing the permission to edit is revoked from the user 480 and the LOCKING_USER variable is set to NULL 490.

Category Server Operation

Figure 5:
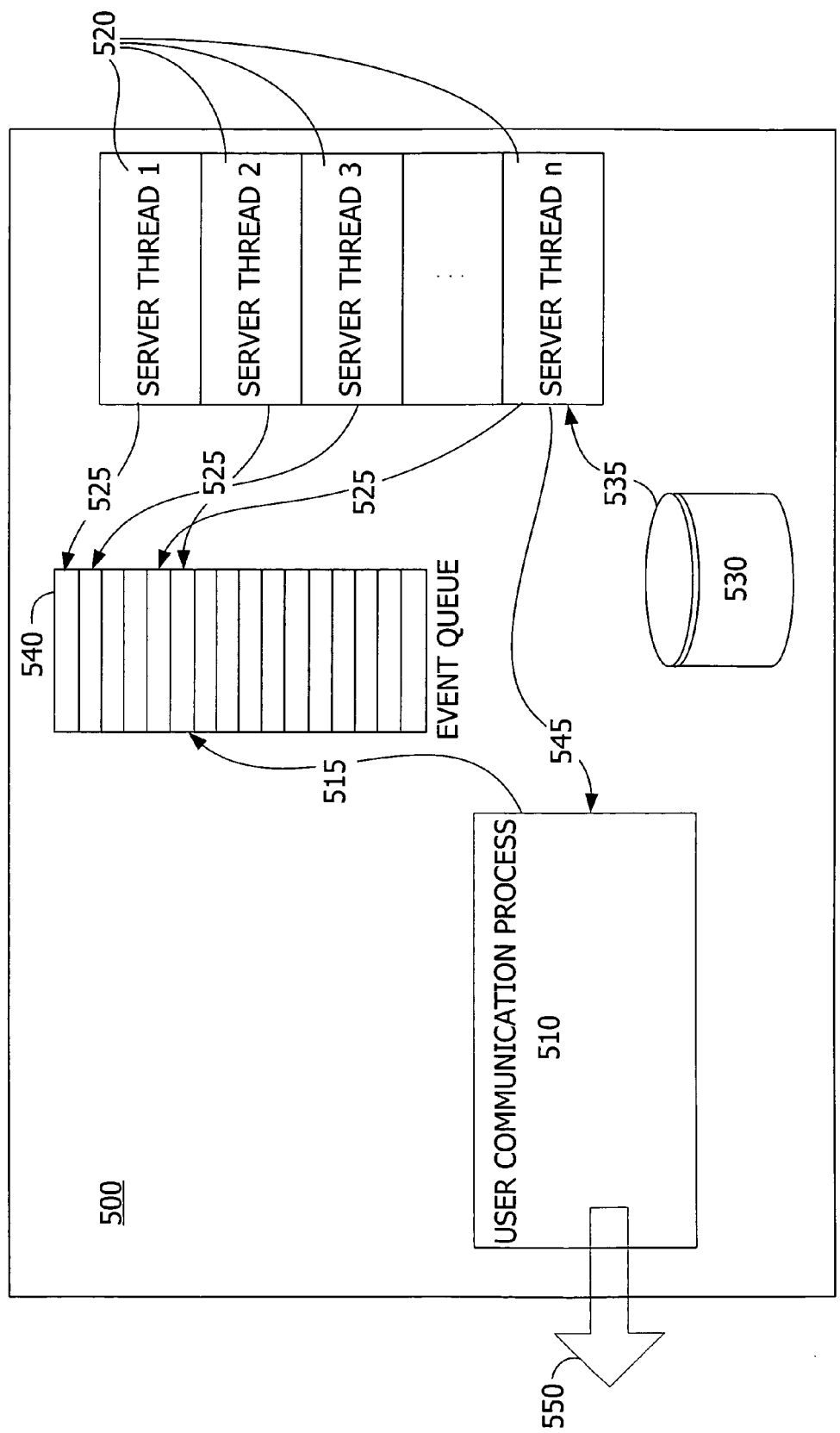
FIG. 5—One embodiment of a category servers structure.

In one embodiment of the present invention, as shown in FIG. 5, the category server runs as a series of thread processes on a single computer 500. A user management thread 510 manages all user communication 550. Multiple server threads run 520 on the category server to process requests from the users managed by the user management thread 510.

In one embodiment of the present invention, the user management thread 510 will handle requests for access to the database, locking of records and alteration of meta-information. This management by a single thread ensures the integrity of the database records. Event requests are posted 515 to an event queue 540 for processing by the server threads. When idle, each server thread 520 will extract an event request 525 for processing. These server threads will then read from the database 530 the meta-information and the compressed, stored information for the requested page 535. The relevant portions of the information will be decompressed for conversion to HTML for presentation to the user 545.

User Interface

Figure 6:
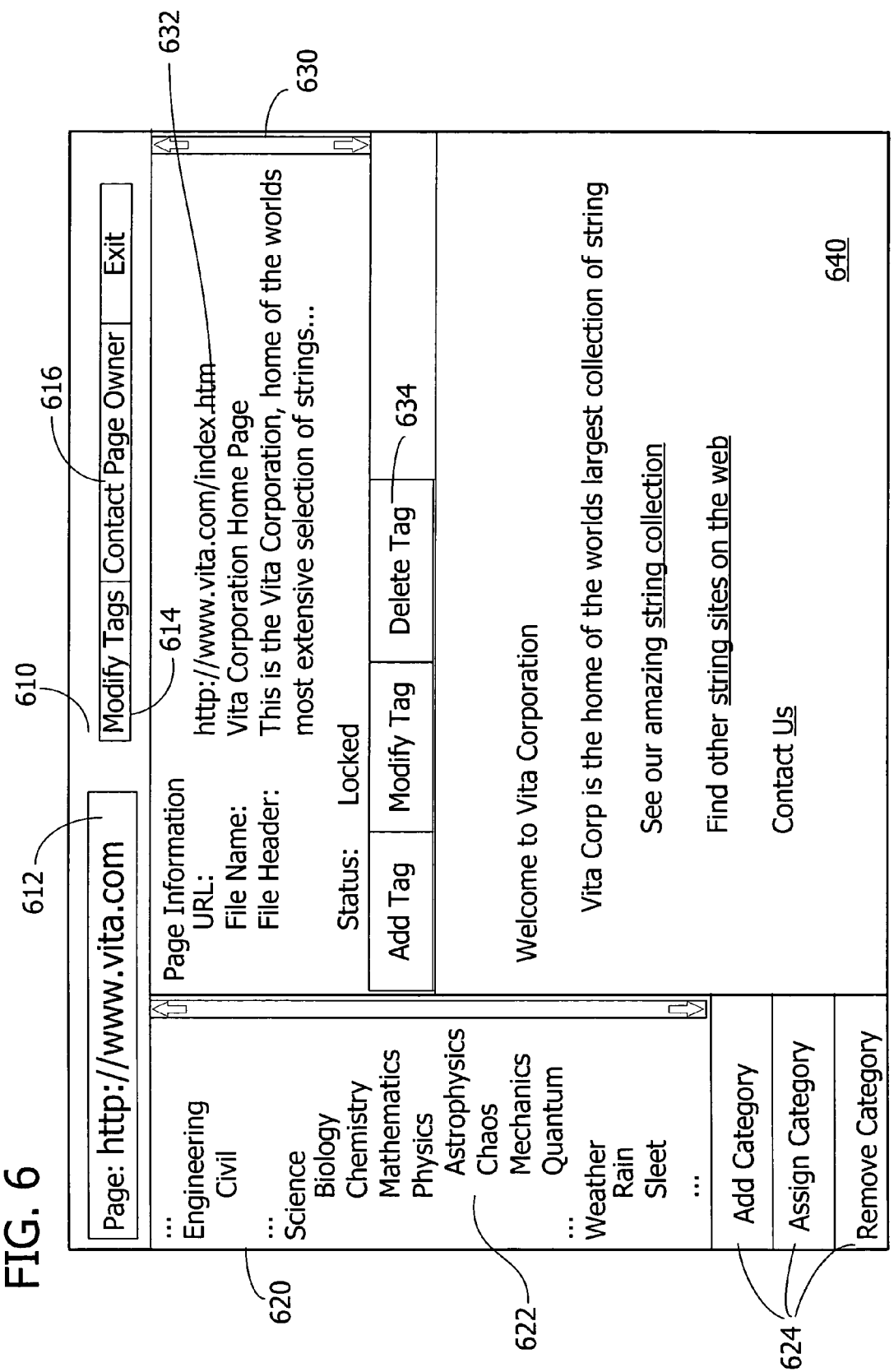
FIG. 6—User Interface for one embodiment of the present invention using an application specific client.

FIG. 6 shows one embodiment of a user interface for an application specific user agent interacting with a category server of the present invention. In this embodiment, the screen on the user agent is divided into four frames. The first frame 510 provides management information for what is being viewed. As shown, this management frame 510 provides a portion of the display area 512 for displaying the URL for the current page. This area is also where the user can type the address for a requested URL. Additionally, this embodiment shows a button 514 for requesting permission to edit the meta data as describe in the discussion associated with FIG. 4. Next, this frame shows a feature for sending an electronic mail message to the owner of the page 516. The owner of the page in this embodiment is the person who was the first to cause a copy of the web page to be placed in the database.

This embodiment also shows a frame 520 in which category information about the database is provided for the user. The top section displays the category to the user 522. This information is shown in a way that reflects the hierarchy that exists in the database. There are primary categories in this database as shown by the Engineering, Science, and Weather entries in the category frame. The primary category entries will have subcategories available under them. These can be progressively displayed by double-clicking on the primary category. For example, by double clicking on the primary category Science, the subcategories Biology, Chemistry, Mathematics, etc. are displayed. This progressive disclosure can proceed until the leaf nodes are encountered.

The bottom section 524 of the frame provides the ability to perform the category management. Categories can be added and deleted. In addition, the assign functionality is used to allow the user, who has currently locked the web to allow for editing of the meta-information information, to assign a web page to a category. In this embodiment, the web page may be assigned to more than one category.

The third frame 530 in this embodiment of the invention shows an interface to allow the viewing, and possibly, editing of the meta information for the currently displayed web page. The current meta information is displayed in the top portion of the frame 532. The bottom portion of the frame 534 will provide the ability to edit the meta information (if enabled). For example, the user may select the Modify Tag button and, upon doing so, a pop-up list appears with the existing meta tags for the web page being displayed. The list in the present example would contain at least URL, File Name, and File Header. The Status field would show locked as the user will not be able to edit the meta information without first obtaining a lock, as previously discussed.

The final frame 510 provides a user with a standard display of HTML. In this embodiment, the web pages will be displayed here as they are retrieved from the database. In the event that the web page does not exist in the database, the category server will need to first fetch the web pages through the web interface as discussed previously. The web page will then be displayed here as retrieved from the copy that is stored in the database. This frame will provide the same functionality as other user agents presenting a web page to a user. Displaying of web pages by a user agent is known in the art and will not be described further.

Computer System

As previously alluded to, various elements of the server/database, including the user management thread and the database server threads of the aforementioned embodiments, can be located on more than one computer. However, one computer will be shown in the embodiment of FIG. 7.

Figure 7:
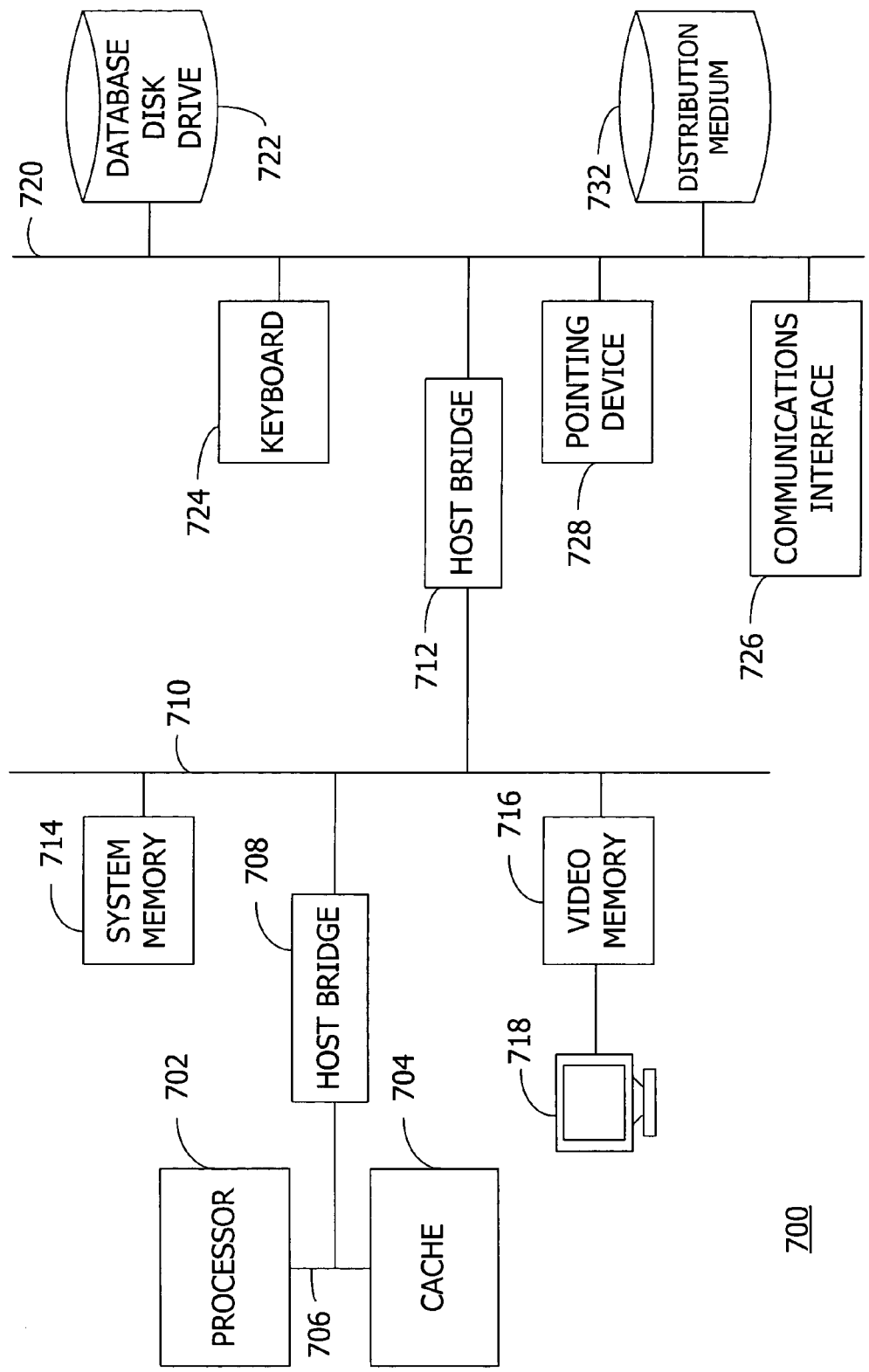
FIG. 7—Hardware embodiment of the category server.

As mentioned, FIG. 7 illustrates one embodiment of a device suitable to be programmed with the utility application of the present invention. As shown, for the illustrated embodiment, user device 700 includes processor 702, processor bus 706, high performance I/O bus 710 and standard I/O bus 720. Processor bus 706 and high performance I/O bus 710 are bridged by host bridge 708, whereas I/O buses 710 and 720 are bridged by I/O bus bridge 712. Coupled to processor bus 706 is cache 704. Coupled to high performance I/O bus 710 are system memory 714 and video memory 716, against which video display 718 is coupled. Coupled to standard I/O bus 720 is keyboard 724, pointing device 728, and communication interface 726. In addition, the database engine 722 is also connected to the standard I/O bus of this embodiment.

These elements perform their conventional functions known in the art. In particular, database 722 and system memory 714 are used to store permanent and working copies of the category storage system. A permanent copy of a pre-populated database may be pre-loaded into disk drive 722 in factory, loaded from distribution medium 732, or down loaded from a remote distribution source (not shown). Distribution medium 732 may be a tape, a CD, a DVD or other storage medium of the like. The constitutions of these elements are known. Any one of a number of implementations of these elements known in the art may be used to form computer system 700.

Certain embodiments may include additional components, may not require all of the above components, or may combine one or more components. Those skilled in the art will be familiar with a variety of alternative implementations. The present invention may be practiced with earlier or later versions of the current level of "standard" specified for HTML, HTTP and URL. Further, the present invention may be practiced with the documents formatted, transferred and addressed using formatting languages, messaging protocols and addressing schemes other than HTML, HTTP and URL.

CONCLUSION

Thus, it can be seen from the above descriptions that a novel method of providing a stable training and testing environment for the generation of automatic categorization engines is provided. This is accomplished through the provision of a database which is stable and independent of any changes which might occur in the content of a page as provided by the original source.

What is claimed is:

1. A method comprising:
   receiving a locator of a network resource;
   determining if a database already contains stored information derived from the network resource at a previous point in time, effectively freezing the network resource to the previous point in time; and
   upon determination that the database does not contain stored information derived from the network resource at the previous point in time, storing information derived from the network resource pointed to by the locator of the network resource, the process of storing comprising:

creating a copy of at least a portion of the network resource pointed to by the locator, and writing the copy to the database.

2. The method of claim 1 wherein the storing of information further comprises compressing the copy prior to writing the copy.

3. The method of claim 1 wherein the storing the information further comprises generating meta information from the copy.

4. The method of claim 3 wherein the generating meta information involves extracting information from the network resource.

5. The method of claim 3 wherein the generating meta information involves deriving information from the network resource.

6. The method of claim 3 wherein the meta information comprises one or more of a file name, a uniform resource locator, a file format, and a language.

7. The method of claim 3 wherein the storing the information further comprises writing the generated meta information to the database.

8. The method of claim 3 further comprising:

receiving instructions to modify the generated meta information; and modifying the generated meta information in accordance with the received instructions to generate modified meta information.

9. The method of claim 8 wherein the storing the information further comprises writing the modified meta information to the database.

10. The method of claim 1 wherein the storing the information further comprises modifying references to objects within the information to reflect the new location of referenced objects as being stored in the database.

11. The method of claim 1 further comprising sending the copied information to a generic user agent.

12. The method of claim 1 wherein the network resource comprises one or more world wide web pages.

13. The method of claim 12 wherein the one or more world wide web pages comprises a main frame and one or more sub-frames.

14. The method of claim 13 wherein the main frame and one or more sub-frames are stored as a single file.

15. An apparatus comprising:

a storage medium having stored therein a plurality of programming instructions designed to:

receive a locator of a network resource, determine if a database already contains stored information derived from the network resource at a previous point in time, effectively freezing the network resource to the previous point in time, and upon determination that the database does not contain stored information derived from the network resource at the previous point in time, store information derived from the network resource pointed to by the locator of the network resource, the process of storing comprising:

creating a copy of at least a portion of the network resource pointed to by the locator, and writing the copy to the database; and a processor coupled to the storage medium to execute the programming instructions.

16. The apparatus of claim 15 wherein the database resides on a separate machine from the processor.

17. The apparatus of claim 15 wherein the storing of information further comprises compressing the copy prior to writing the copy.

18. The apparatus of claim 15 wherein the storing the information further comprises generating meta information from the copy.

19. The apparatus of claim 18 wherein the generating meta information involves extracting information from the network resource.

20. The apparatus of claim 18 wherein the generating meta information involves deriving information from the network resource.

21. The apparatus of claim 18 wherein the meta information comprises one or more of a file name, a uniform resource locator, a file format, and a language.

22. The apparatus of claim 18 wherein storing the information further comprises writing the generated meta information to the database.

23. The apparatus of claim 18 wherein the programming instructions are further designed to:

receive instructions to modify the generated meta information; and modify the generated meta information in accordance with the received instructions to generate modified meta information.

24. The apparatus of claim 23 wherein storing the information further comprises writing the modified meta information to the database.

25. The apparatus of claim 15 wherein the storing the information further comprises modifying references to objects within the information to reflect the new location of referenced objects as being stored in the database.

26. The apparatus of claim 15 further comprising sending the copied information to a generic user agent.

27. The apparatus of claim 15 wherein the network resource comprises one or more world wide web pages.

28. The apparatus of claim 27 wherein the one or more world wide web pages comprises a main frame and one or more sub-frames.

29. The apparatus of claim 28 wherein the main frame and one or more sub-frames are stored as a single file.

* * * * *